United States Patent [19]

Garside

[11] Patent Number: 4,486,159

[45] Date of Patent: Dec. 4, 1984

[54] ROTOR FOR A ROTARY ENGINE

[75] Inventor: David W. Garside, Solihull, England

[73] Assignee: Norton Motors (1978) Limited, Staffordshire, England

[21] Appl. No.: 608,923

[22] Filed: May 11, 1984

Related U.S. Application Data

[63] Continuation of Ser. No. 378,436, May 17, 1982, abandoned.

[30] Foreign Application Priority Data

Jun. 20, 1981 [GB] United Kingdom ............... 8119075

[51] Int. Cl.³ .......................... F01C 1/22; F01C 21/06
[52] U.S. Cl. .................................. 418/61 A; 418/91
[58] Field of Search .................... 418/61 A, 86, 91

[56] References Cited

U.S. PATENT DOCUMENTS

| 3,042,009 | 7/1962 | Froede et al. | 418/61 |
| 3,098,605 | 7/1963 | Bentele et al. | 418/61 A |
| 3,802,810 | 4/1974 | Reitz et al. | 418/61 A |

FOREIGN PATENT DOCUMENTS

695953 10/1964 Canada ................................. 418/91
2315595 10/1974 Fed. Rep. of Germany ... 418/61 A Primary Examiner—John J. Vrablik
Assistant Examiner—T. Olds
Attorney, Agent, or Firm—Pearne, Gordon, Sessions, McCoy, Granger & Tilberry

[57] ABSTRACT

A rotor for a rotary engine of the kind comprising a rotor which rotates in a cavity to form working chambers within the cavity which vary in volume as the rotor rotates, the rotor comprising a body having, in a plane transverse to the axis of rotation of the rotor, an outer profile of generally equilateral triangular shape with outwardly curved sides and an inner profile providing part peripheral location formations in regions of the mid-points of the rotor sides in engagement with an insert, the insert providing a bearing part and an indexing gear of the rotor, the inner profile of the body adjacent each apex of the rotor being radially outwards of the inserts of the entire axial length of the rotor thereby providing a gap between the location portions so that axial cooling passages are formed bounded by the rotor body and the insert.

10 Claims, 7 Drawing Figures

ROTOR FOR A ROTARY ENGINE

This is a continuation of application Ser. No. 378,436, filed on May 17, 1982, now abandoned.

BACKGROUND OF THE INVENTION

Field of the Invention

This invention relates to a rotor for a rotary internal combustion engine of the kind, hereinafter referred to as being of the kind specified, in which a rotary piston or rotor, rotates within a cavity in a housing, the rotor and the wells of the cavity being so shaped that working chambers are formed therebetween which vary in volume as the rotor rotates and the cavity being provided with inlet and exhaust ports.

More particularly, but not exclusively, the invention relates to a rotor for a so-called Wankel engine in which the housing has a two-lobed epitrochoidal bore which forms the cavity and has end plates which form axially spaced end walls closing the cavity, and the rotor has an outer profile of generally equilateral triangular shape with outwardly curved sides such as convexly curved sides, and is mounted on an eccentric journal of a main shaft and is geared to rotate in a planetary manner within the cavity at one third of the speed of rotation of the main shaft.

One method of cooling the rotor of such an engine is to form one or more passageways in the rotor which form an induction passage to the working chambers so that induced air, or a proportion of induced air, is drawn through and thereby cools the rotor. Alternatively, cooling air may be forced through the passageways by an external fan or pump. An example of such an engine is shown in Canadian Pat. No. 695,953. Such engines are hereinafter referred to as having an air-cooled rotor.

If desired, fuel may be introduced into the induced air to pass through the rotor therewith and such an engine, although specifically referred to as having an air-cool rotor, is more specifically referred to hereinafter as having a charge-cooled rotor.

A problem has been encountered in high-power engines having an air-cooled or charge-cooled rotor, due to mechanical failure of the rotor when the rotor is subjected to high mechanical and thermal stresses, which are commonly imposed during high speed and high load running, for a long period of time.

Accordingly objects of the invention are to provide a new and improved rotor for a rotary engine of the type specified and a new and improved engine, wherein the above mentioned problem is overcome or is reduced.

SUMMARY OF THE INVENTION

According to a first aspect of the present invention, we provide an air-cooled rotor in a rotary engine of the kind specified, comprising a body having, in a plane transverse to the axis of rotation of the rotor, an outer profile of generally equilateral triangular shape with outwardly curved sides and an inner profile providing part peripheral location portions in the regions of the mid-points of the rotor sides in engagement with an insert, the insert providing a bearing part and an indexing gear of the rotor, the inner profile of the body adjacent each apex of the rotor, being radially outwards of the insert over the entire axial length of the body, thereby providing gaps between the location portions so that axial cooling passages are formed, peripherally bounded by the rotor body and the insert which extend continuously over the entire axial length of the body, and the engine having means to pass cooling air axially through said axial cooling passages from one end of the body to the other end thereof.

The present invention overcomes the problem of rotor failure described above in the following way.

Prior to the present invention, air and charge-cooled rotors in engines of the kind specified have been cast in one piece and possess an outer profile of generally equilateral triangular configuration with curved sides in the same way as the rotor of the present invention, but the inner profile has been of generally cylindrical configuration and provided with a rolling element bearing outer race and indexing gear. The bearing outer race has been provided by means of an insert received within the cylindrical inner profile and the indexing gear has been machined directly in the inner profile of the rotor or, alternatively, machined in an axial extension of the insert so that the insert has provided both the bearing and the indexing gear.

Hitherto, rotor cooling has been effected by forming axial cooling passages adjacent each apex of the rotor. These axial passages were bounded on their radially inner side, for at least part of their axial length through the rotor, by bridging portions cast integrally with the remainder of the rotor, these bridging portions generally also providing part of the cylindrical surface with which the insert is engaged. It has been found that the bridging portions fracture when the rotor is subjected to the above mentioned high mechanical and thermal stresses, resulting in failure of the engine.

We have found that the fracturing essentially results from the outer part of the casting, which is exposed to the combustion gases, becoming hot and expanding more than the bridging portions which are not exposed to combustion gases but are exposed to cooling by the inducted cooling air or air/fuel mixture. In addition, variable mechanical stresses are imposed on the bridging pieces resulting from gas pressure and inertia loads and from gear-tooth impact loads, if the gear teeth are cut integrally in the bridging portions.

Although alternative rotor casting materials with varying properties of Youngs modulus, coefficient of thermal expansion, coefficient of thermal conductivity, tensile strength and ductility have been proposed and may alleviate the problem to some degree they are known not to eliminate the problem entirely as there tends to be trade-off in one or more of the properties against one or more of the others.

If, for example, the casting material, which is normally SG iron, is heat treated to have higher maximum tensile strength, then the ductility is reduced. In any case, difficulties arise with machining the rotor casting if the hardness of the metal is too high. If hardening is carried out after machining then unacceptable distortion may occur during hardening.

If the bridging portions are cast relatively thin to give more flexibility and resistance to thermal stresses they are weaker mechanically. If they are thicker, and therefore stronger mechanically, they are more prone to thermal stresses.

Although it is possible for a designer to vary the thickness and shape of the bridging portions, there are design limitations. For example, it is desirable for best functioning of the engine that for a given size of rotor:

(a) the axial cooling passage cross-sectional area is large enough to allow good breathing of the engine;

(b) the rotor weight is low;

(c) the rotor insert is large so that the bearing has adequate load bearing capacity;

(d) the casting is easy to make and of low cost.

In the present invention no bridging portions are present in the rotor casting, and thus the above described problem of rotor fracture is overcome and in addition, an improved balance between the above design criteria (a)–(d) above is achieved.

Because the bridging portions have been eliminated from the design, the rotor casting can now conveniently be cast without having to use separate cores and therefore the cost of production is reduced. Also because the bridging portions have been eliminated, the area available for axial cooling passages can be made larger than has conventionally been possible.

It is preferred that the location portions do not project peripherally beyond the peripherally widest dimension of the axial cooling passages since any projection beyond the widest peripheral dimension reduces the cross-sectional area of the passage compared with that which it would have if the location portions terminated at the widest peripheral dimension. However, if such reduction in cross-sectional area in any particular case is not of overriding importance, the location portions can project beyond the maximum peripheral dimension of the axial cooling passages but provide gaps of relatively small width in the peripheral direction between the portions. The minimum width in these circumstances is determined solely by ease of manufacture. For example, it is preferred to produce the rotor with the gaps by casting in which case a six millimeter gap would be about the minimum practical width. If desired however, the gaps could be produced by machining in which case they could be considerably smaller. The minimum width is that necessary to permit of relative movement between adjacent location portions thereby to avoid thermal and other stresses discussed above.

Preferably the insert is of a one-piece turned steel construction to maintain manufacturing costs low, and to ensure that the insert has sufficient radial rigidity to withstand the stresses imposed thereon, although if required, the insert may be of composite sectional construction.

The body between the inner and outer profiles may be of such configuration to provide the rotor with the necessary strength without consideration of the strength of the insert, to withstand gas pressures and inertia loads imposed thereon in use, although if required, the rotor body and, the insert may be suitably designed together to possess the necessary resistance to deformation, despite the insert being located with less than the whole of its periphery in engagement with the rotor body.

The part-peripheral location portions may be part circular and the insert may be circular in cross-section, although other configurations are possible.

The insert may be an interference fit with the part-peripheral location portions of the rotor body and additional suitable securing means may be provided to prevent movement, such as rotation and/or axial movement of the insert, relative to the rotor body.

Said securing means may comprise at least one member received in an axial bore, part of the circumference of which is formed in said insert and part of the circumference of which is formed in said rotor body.

Said member may comprise, a roll pin received in a non-threaded axial bore, to prevent relative rotational movement, although preferably said member may be threaded and be received in a threaded axial bore, to prevent relative axial movement also. Three such members may be provided.

Alternatively, other means may be provided for securing the insert in and against movement relative to the rotor body.

The wall of the or each axial cooling passageway in the rotor body may be provided with cooling fins. We prefer, for casting reasons and for reasons of imposing the minimum restriction to the cooling air flow, that the cooling fins are disposed axially.

According to a second aspect of the invention we provide a rotary engine of the kind specified having a rotor according to the first aspect of the invention.

The engine may be of the so-called Wankel type.

BRIEF DESCRIPTION OF THE DRAWINGS

The invention will now be described in more detail, by way of example, with reference to the accompanying drawings, wherein.

DESCRIPTION OF THE PREFERRED EMBODIMENTS

Figure 4:
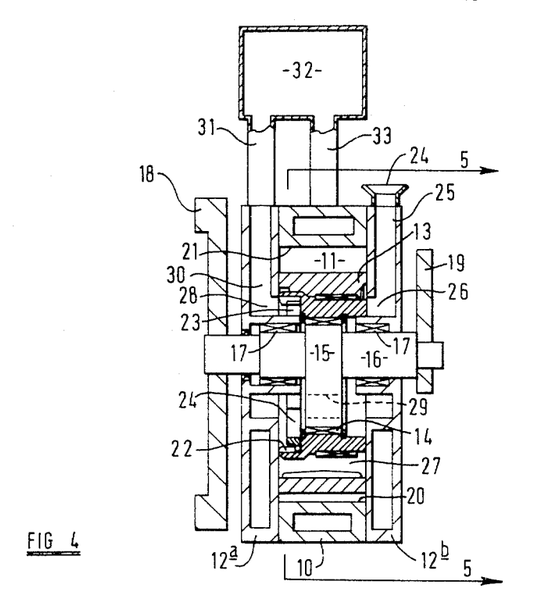
FIG. 4 is a diagrammatic cross-section through an engine according to the second aspect of the invention.
Figure 5:
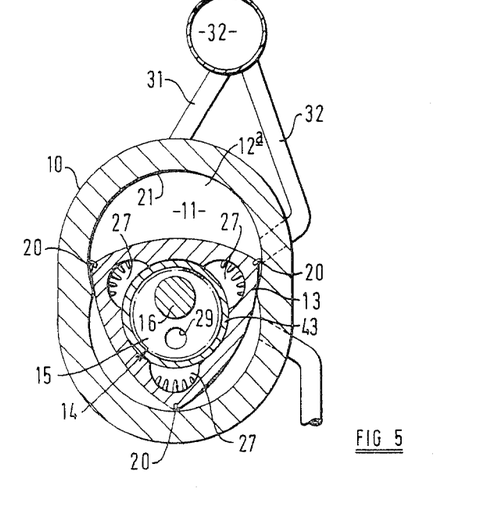
FIG. 5 is a section on the line 5—5 of FIG. 4.

Referring first to FIGS. 4 and 5 of the drawings, there is illustrated a rotary engine, which is of the so-called Wankel type and comprises a stationary housing 10 which has a two-lobed epitrochoidal bore 11 therethrough and end plates 12a, 12b to close the bore at the ends thereof.

A rotor 13 of equilateral triangular shape having outwardly curved sides is rotatably mounted by a needle bearing 14 upon an eccentric journal 15 of a main shaft 16 which is rotatably mounted in bearings 17 mounted in the end plates 12a, 12b and has a fly wheel 18 and a balance weight 19 secured to its opposite extremities. Sealing strips 20 carried at the apices of the rotor 13 maintain sealing contact with the peripheral wall 21 of the epitrochoidal bore 11 as the rotor 13 rotates in planetary manner within the bore 11. The rotor 13 has an internally toothed indexing gear 22 which meshes with an externally toothed fixed gear 23 carried by the end plate 12a, and the gear 22 controls the planetary motion of the rotor 13, the teeth ratios being such that the rotor 13 rotates once for every three revolutions of the main shaft 16.

The induction system of the engine is such that air flows through and cools the rotor 13 and air passes in sequence through an inlet 24, a passage 25 and an opening 26 in end plate 12b, passageways 27 in apex portions of the rotor 13 and through an opening 28 in the end plate 12a. The induced air also flows through an aperture 29 in the eccentric journal 15 which is thereby cooled.

In a conventional arrangement the air would flow directly from the opening 28 in the end plate 12a through an inlet port to working chambers to the engine formed by the rotating rotor 13 but in the engine of the present example a passage 30 in the end plate 12a, which communicates with the opening 28, is connected by a pipe 31 to a chamber 32 which is in turn connected by a pipe 33 to the inlet port, as described in more detail in our published Specification No. 1,386,811.

Fuel may be introduced into the inducted air flow by means of a carburettor either before the air passes into the inlet 24, such that it is an air/fuel mixture which flows through the rotor 13, so that the rotor 13 is charge-cooled, or as the air flows through the pipe 33 from the chamber 32, or alternatively it may be metered directly into a working chamber by fuel injection means. In both of the latter cases the rotor is air-cooled.

Figure 1:
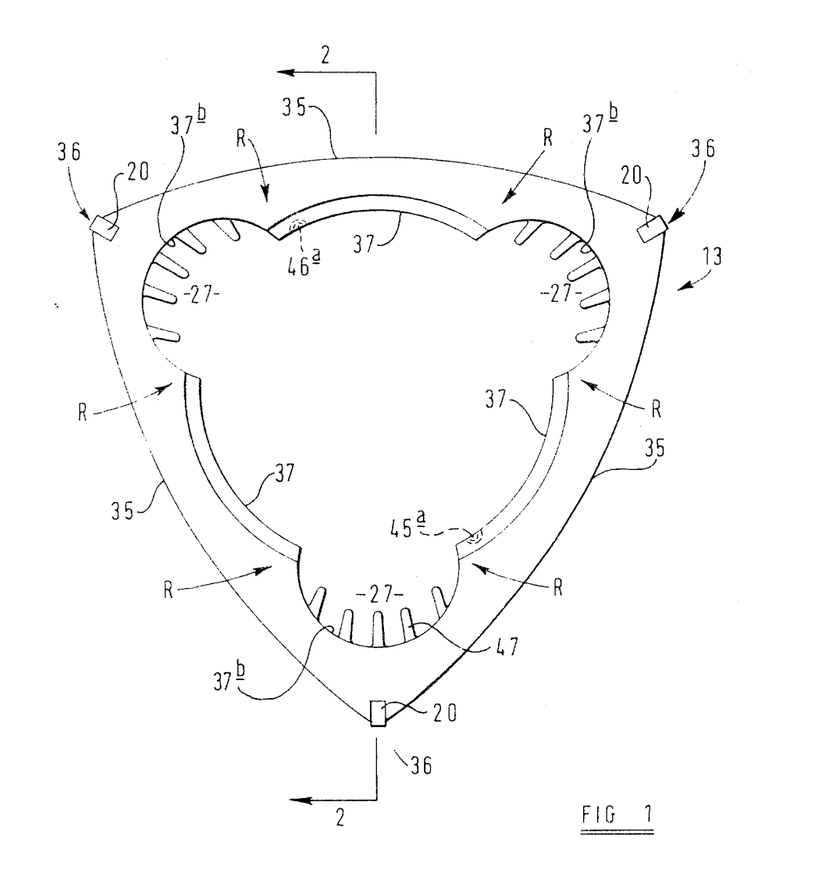
FIG. 1 is an end elevation of a rotor in accordance with the first aspect of the invention.

Referring now particularly to FIG. 1, the rotor 13 comprises a body having an outer profile of generally equilateral triangular shape with three outwardly curved sides 35 which meet at apices 36 whereat the above mentioned sealing strips 20 are provided. The rotor body also has an inner profile which provides part-circular location portions 37, which are of different diameters at different positions axially of the rotor as shown in FIG. 2 where the stepped nature of the location portions 37 is best illustrated.

Adjacent each apex 36 there is a gap between the location portions 37 since the internal profile of the rotor 13 in this region provides a part-cylindrical wall 37b to provide a recess in the rotor 13. Accordingly, when an insert 39, illustrated in FIG. 3, is engaged with the location portions 37, the above mentioned passageways 27 are formed between the wall part 37b and the external surface 40 of the insert 39.

Figure 2:
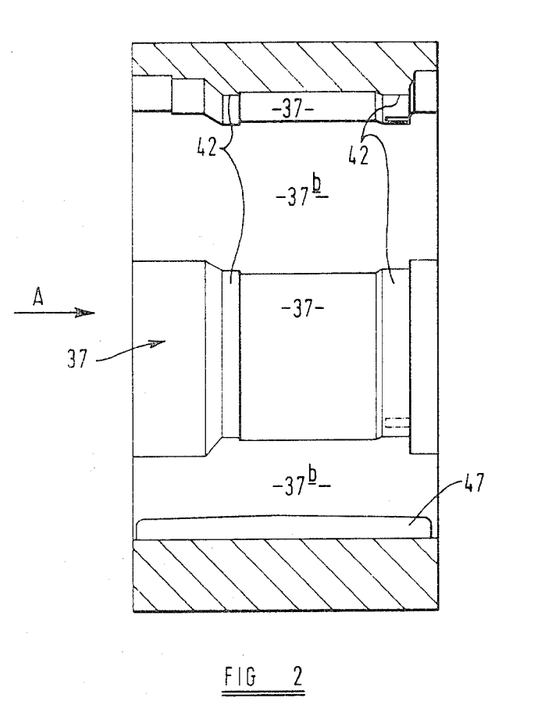
FIG. 2 is a section on the line 2—2 of FIG. 1.
Figure 3:
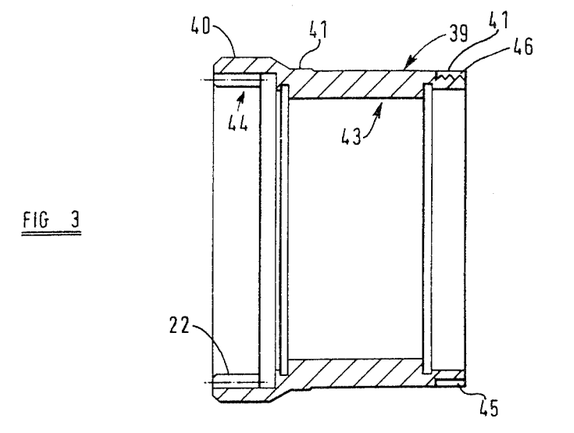
FIG. 3 is a longitudinal cross-sectional view through an insert for the rotor of FIGS. 1 and 2.

Referring now particularly to FIGS. 2 and 3, the external surface 40 of the insert 39 is adapted to be an interference fit at local axial bands 41 with parts 42 of the location portions 37.

Figure 7:
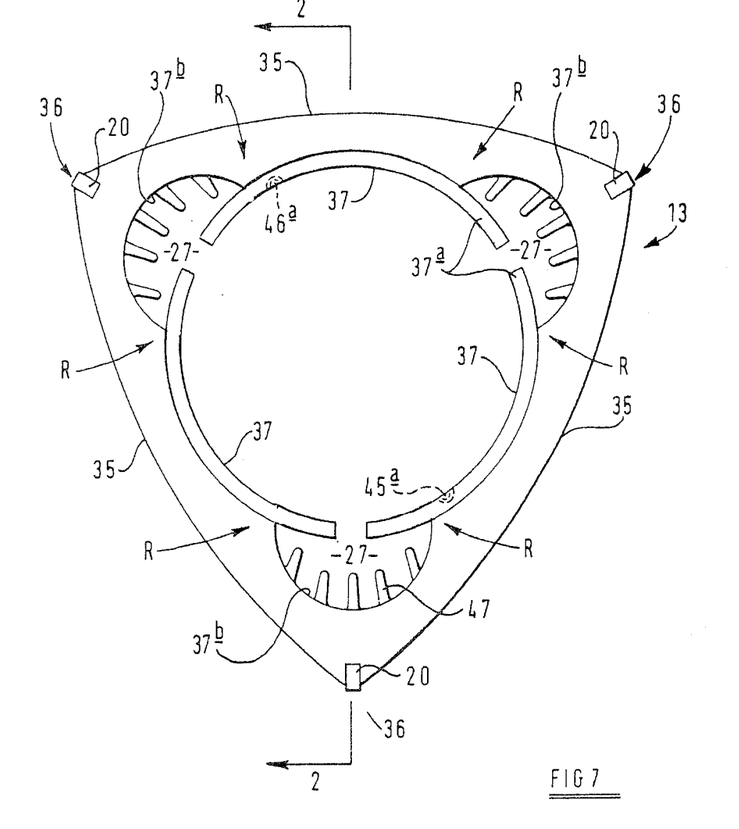
FIG. 7 is an end elevation of a rotor in accordance with a modification of the first aspect of the invention.

The gaps between the adjacent location portions 37 are, in the present example, of a circumferential width equal to the maximum circumferential width of each passageway 27. Thus, no part of the rotor body obstructs the "mouth" of the recess and hence the cross-sectional area of the passageway 27 is maintained as large as possible. If desired however, where the consequent reduction in cross-sectional area of the axial cooling passages is unimportant, the location portions 37 may project partly across the "mouth" of the recess so as to lie inside the maximum circumferential width of the recess, as illustrated at 37a in FIG. 7. The minimum width of the gap is determined mainly by practical considerations as to the way in which it is desired to manufacture the rotor body. For example, if it is desired to produce the gap by casting, the minimum practical gap is of approximately 6 mm width. If however the gap is to be machined in a previously continuous location portion 37, the gap can be of a width down to one or two thousandths of an inch, so long as there is sufficient gap to permit movement between adjacent location portions 37 to avoid the above described thermal and mechanical stresses.

The internal surface of the insert 39 provides, in the region indicated at 43, the outer race of the needle bearing 14 and in the region indicated at 44, is machined to provide the indexing gear 22.

In order to prevent rotation of the insert 39 relative to the rotor body, a plurality of cylindrical bores 45, 45a are formed in the assembly of insert 39 and rotor body so that approximately half the circumference of each bore 45 lies within the insert 39 and the other half 45a within the rotor 13, and a roll pin (not shown) is driven into the bores 45 and 45a. In addition, at least one threaded bore is similarly formed between the insert and rotor body as indicated at 46, 46a, and a grub screw is received within each bore 46, 46a to further secure the connection and also to prevent axial movement of the insert 39 relative to the rotor 13.

The rotor body is made as a one-piece casting and there is no opening in the rotor body between the external surface thereof and the internal surface thereof, which comprises the location portions 37 and the surface parts 37b of the recesses. The above mentioned passageways 27 are formed between the insert 39 and the parts 37b of the internal surface of the rotor body.

Figure 6:
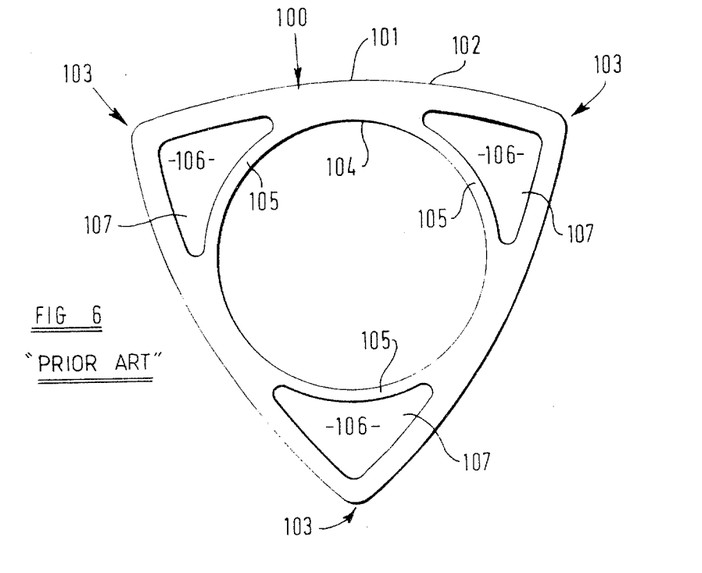
FIG. 6 is an end elevation of a prior art rotor.

The above described construction of rotor is to be contrasted with the form of rotor known hitherto and illustrated in FIG. 6, where the rotor body is indicated at 100 and comprises a generally equilateral triangular shaped external surface 101, having outwardly curved sides 102 which meet at apices 103, at which sealing strips (not shown) are provided. The internal surface of the rotor 104 (which corresponds to the location portions 37 and surface parts 37b of the rotor body embodying the present invention) is provided on an inner portion which extends continuously circumferentially of the rotor for at least some axial proportion of the rotor, and hence provides bridging portions 105 of the inner part which bridge voids 106 formed in the rotor body so that the voids 106 provide passageways 107 corresponding to the passageways 27 of the rotor embodying the present invention.

The bridging portions 105 are integral with remainder of the rotor body.

An insert is received within the surface 104 to provide an outer race for a needle bearing and may, if desired, also be machined to provide gear teeth for the internal indexing gear of the rotor. Alternatively, the indexing gear is machined directly in the material of the inner portion of the rotor.

It has been found in practice that such a rotor can fail under conditions of high stress due to fracture of the bridging portions 105 as described previously.

In contrast to the known form of rotor illustrated in FIG. 6, and as described above, the present invention differs in the absence of the bridging portions 105, in other words there is a circumferentially extending discontinuity or gap in the part of the rotor which provides the internal surface portions with which the insert is engaged, over the full axial length of the rotor, and the rotor body but particularly adjacent the apices 36 and in the regions around the positions indicated at R, is made adequately strong to provide the desired strength to withstand the bending moments imposed on the rotor sides, in use, in the absence of any bridging portions. It has been found that as a result, the rotor does not fail.

In the present example, it will be seen that each passage 27 is provided with five cooling ribs or fins 47 to facilitate heat transfer between the cooling air or air/fuel mixture and the rotor. The fins may be omitted if desired or be of a different profile to that illustrated.

The rotor 13 is made as a casting in spheroidal graphite (SG) iron, whilst the insert 39 is made as a forging in an appropriate bearing steel or from a hollow bar of bearing steel. It will, of course, be appreciated that other suitable materials may be used if desired.

It has been found that an engine embodying a rotor as described and illustrated above, has been found in comparison tests to have a life of fifty three hours when operated at a given overload speed, compared with a life of one and three quarter hours for a rotor built to the same standards but of the design illustrated in FIG. 6. It is also to be noted that a rotor embodying the present invention is significantly easier to manufacture than a rotor as illustrated in FIG. 6 because of the absence of the need to provide cores for the recesses to provide the passageways 27.

In the example described, the insert 39 comprises a one piece construction, but if desired, the insert 13 may be sectional. Where the insert 13 is sectional, two or more sections of the insert 13 may engage any location portion 37.

The rotor body of the rotor 13 may be designed to withstand the thermal and mechanical stresses imposed thereon, without any consideration as to the strength of the insert 13. However if required, the rotor body and insert together, may be designed to withstand the stresses.

In either case, the insert 39 will need to be adequately strong to withstand the forces imposed thereon during operation of the engine.

Although the invention has been described in relation to a Wankel-type engine, it will be appreciated that a rotor in accordance with the invention may be used in other types of rotary engine if required, although some modifications may be required.

I claim:

1. An air cooled rotor in a rotary internal combustion engine of the kind comprising a cavity, means for mounting the rotor in the cavity for rotation, the walls of the cavity being shaped to provide walls of working chambers formed by the rotating rotor, the working chambers varying in volume as the rotor rotates, the engine having inlet and outlet ports to the cavity, the rotor comprising a body having, in a plane transverse to the axis of rotation of the rotor, an outer profile of generally equilateral triangular shape with outwardly curved sides and an inner profile providing part peripheral location portions in the regions of the mid point of the rotor sides, an insert in engagement with the part peripheral location portions, the insert providing a bearing part and an indexing gear of the rotor, the inner profile of the body adjacent each apex of the rotor, being radially outwards of the insert over the entire axial length of the body, thereby providing gaps between the location portions to provide axial cooling passages, peripherally bounded by the rotor body and the insert, which extend continuously over the entire axial length of the body, and the engine having means to pass cooling air axially through said axial cooling passages from one end of the body to the other end thereof.

2. A rotor according to claim 1, wherein the location portions do not project peripherally beyond the peripherally widest dimension of the axial cooling passage.

3. A rotor according to claim 1 wherein the location portions project beyond the maximum peripheral dimensions of the axial cooling passages but provide gaps of relatively small width in the peripheral direction between the portions.

4. A rotor according to claim 1 wherein the insert is of a one piece construction.

5. A rotor according to claim 1 wherein the body between the inner and outer profiles is of such configuration to provide the rotor with the necessary strength, without consideration of the strength of the insert, to withstand the gas pressures and inertia loads imposed thereon in use.

6. A rotor according to claim 1 wherein the part peripheral location portions are part circular and the insert is circular in cross section.

7. A rotor according to claim 1 wherein the insert is an interference fit with the part peripheral location portions of the rotor body, additional securing means being provided to prevent movement of the insert relative to the rotor body.

8. A rotor according to claim 7 wherein said securing means comprise at least one member received in an axial bore, part of the circumference of which is formed in said insert and part of the circumference of which is formed in said rotor body.

9. A rotor according to claim 1 wherein the wall of the axial cooling passageway in the rotor body is formed with axially extending cooling fins.

10. A rotor according to claim 1 wherein the housing has a two-lobed epitroichoidal bore which forms the cavity and end plates which form axially spaced end walls closing the cavity, the rotor being mounted on an eccentric journal of a main shaft and being secured to rotate in a planetary manner within the cavity at one third of the speed of rotation of the main shaft.

* * * * *